United States Patent [19]

Greenhalgh

[11] Patent Number: 4,501,146

[45] Date of Patent: Feb. 26, 1985

[54] DETECTION OF FREE LIQUID IN CONTAINERS OF SOLIDIFIED RADIOACTIVE WASTE

[75] Inventor: Wilbur O. Greenhalgh, Richland, Wash.

[73] Assignee: The United States of America as represented by the United States Department of Energy, Washington, D.C.

[21] Appl. No.: 461,283

[22] Filed: Jan. 27, 1983

[51] Int. Cl.³ .............................................. G01F 23/28
[52] U.S. Cl. .................. 73/290 B; 73/DIG. 1; 376/258; 376/272
[58] Field of Search .......... 73/290 V, DIG. 1, 290 B; 376/258, 272; 367/DIG. 908; 340/621

[56] References Cited

U.S. PATENT DOCUMENTS

| | | | |
|---|---|---|---|
| 1,954,833 | 4/1934 | Schwarzkopf | 33/126.7 R X |
| 2,883,861 | 4/1959 | Van Valkenburg | 73/290 V |
| 3,286,098 | 11/1966 | Long et al. | 367/908 X |
| 3,447,374 | 6/1969 | Cohn et al. | 73/290 R |
| 4,101,865 | 7/1978 | Schurr | 340/621 |
| 4,170,135 | 10/1979 | Booman et al. | 73/304 C |
| 4,170,765 | 10/1979 | Austin et al. | 367/908 X |
| 4,183,007 | 1/1980 | Baird | 73/290 V X |
| 4,221,004 | 9/1980 | Combs et al. | 73/290 V X |
| 4,365,509 | 12/1982 | Cornelis | 73/290 V |

FOREIGN PATENT DOCUMENTS 1074281  4/1955  Fed. Rep. of Germany ...... 367/908

OTHER PUBLICATIONS

"Ultrasonic Liquid Level Switches", Acoustica Document D0550A, 1959, p. 14.
"Detection of Free Liquid in Sealed Containers Simulating Drums of Solidified Radioactive Liquid Waste", Greenhalgh et al., 3rd Int. Conf. on Nondestructive in the Nuclear Industry, (1980), pp. 667-681.

Primary Examiner—Daniel M. Yasich
Attorney, Agent, or Firm—Edward W. Nypaver; Robert Southworth, III; Richard E. Constant

[57] ABSTRACT

A method of nondestructively detecting the presence of free liquid within a sealed enclosure containing solidified waste by measuring the levels of waste at two diametrically opposite locations while slowly tilting the enclosure toward one of said locations. When the measured level remains constant at the other location, the measured level at said one location is noted and any measured difference of levels indicates the presence of liquid on the surface of the solidified waste. The absence of liquid in the enclosure is verified when the measured levels at both locations are equal.

4 Claims, 2 Drawing Figures

DETECTION OF FREE LIQUID IN CONTAINERS OF SOLIDIFIED RADIOACTIVE WASTE

The U.S. Government has rights in this invention pursuant to Contract No. DE-AC14-76FF02170 between the U.S. Department of Energy and the Westinghouse Electric Corporation.

BACKGROUND OF THE INVENTION

The present invention relates generally to the detection of levels of materials in containers and, more particularly, to a method of detecting the presence of free liquids in large sealed containers of solidified liquid radioactive waste.

A serious problem encountered in virtually every aspect of the nuclear industry is the generation of low level radioactive liquid waste, generally referred to as "radwaste". One common expedient for handling such liquid radwaste in accordance with Federal regulations is to solidify the same in sealed metal drums or containers for burial in a proper underground depository. The three most widely known matrixes for solidifying liquid wastes are cement, urea formaldehyde (UF) and bitumen. However, improper solidification with any of these matrixes can lead to incomplete binding of the liquid or result in the subsequent formation of liquid on the top surface of the solidified portion following the initial set.

Generally, the present industry method of verifying the absence of free liquid under the American National Standard Institute (ANSI) guidelines is by visual examination and extensive destructive internal sectioning and examination of representative drums of the solid. Any appreciable change in formulation of the solidification process requires new testing. However, the destructive testing of a small number of representative solidified radwaste samples, because of their highly variable nature, cannot accurately verify the presence or absence of liquids within all the sealed solid waste containers. Moreover, this destructive testing procedure is slow and exposes the solid radioactive waste which must be re-contained prior to disposal. Furthermore, the opening of sealed radwaste containers is illegal in most states except under strict government audited and monitored conditions.

In light of the above, it can be appreciated that there is a need to develop a technique for nondestructively testing sealed radwaste containers to quickly and accurately verify the absence or presence of free liquid therein. A technique for determining free liquids in radwaste containers has been developed for small waste drums, i.e., drums of approximately 55 gallon capacities, and is described in an article entitled "Detection of Free Liquid in Sealed Containers Simulating Drums of Solidified Radioactive Liquid Waste" by Greenhalgh et al presented at the 3rd International Conference on Nondestructive Evaluation In The Nuclear Industry (1980), pp. 667-681. Basically, one of the procedures disclosed therein involves the application of heat at a constant rate for a predetermined time to an exterior surface of a closed radwaste container or drum. When the heat input is terminated, the surface temperature of the drum begins to decrease. If water is present adjacent the drum surface, the surface temperature of the drum in that region will fall faster than if backed by solids. Thus, after terminating the heat input, the surface temperature of the drum is quickly mapped or scanned by an infrared scanning camera. The mapped temperatures show up in different shades of light corresponding to differences of heat conductivity of the physically different materials, such as liquids and solids, in the drum.

The other procedure described in the above article involves heating the container with a temperature sensitive thermal image transducer having a transparent backing. The transducer is equipped with metal foil heating elements coated with a thermally sensitive phosphor that exhibits a thermal image through the transparent backing in accordance with the heat absorption characteristics of the materials contained in the drum, thereby distinguishing between liquids and solids. In both procedures described above, the drums can be tilted to detect and measure any liquids disposed on the top surface of the solid.

While these techniques admirably serve their purposes on the smaller 55 gallon containers, which have wall thicknesses ranging from 1.087 to 1.519 millimeters, they are not satisfactory in detecting free liquids in the larger containers, such as the 50 cubic feet (374 gallons) radwaste containers having wall thicknesses of at least 6.35 millimeters. These larger wall thicknesses preclude reliable detection of the differences in heat conductivity between the solids and liquids behind the container walls. Thus, there is no known nondestructive method for determining free liquids in large waste containers of the 50 cubic feet and larger capacities.

SUMMARY OF THE INVENTION

Accordingly, it is an object of the present invention to provide a new and useful method of nondestructively detecting the presence of a free liquid formation in sealed enclosures containing solidified waste.

It is another object of this invention to provide a new and useful method of nondestructively estimating the volume of any free liquid present in a sealed enclosure containing solidified waste.

In one aspect thereof, a method for nondestructively detecting liquids in sealed enclosures containing solidified materials is characterized by the provision of a pair of devices for measuring the levels of the container contents at two diametrically spaced locations while tilting the container toward one of the measuring devices. When the level of the contents measured by the other device remains constant, the level recorded by the said one measuring device is noted. Any difference of levels measured between the two locations indicates the presence of liquid within the enclosure and the volume thereof can be readily calculated by well known volume formulas.

The foregoing and other objects, advantages, and characterizing features of the present invention will become clearly apparent from the ensuing detailed description of an illustrative embodiment thereof, taken together with the accompanying drawings wherein like reference characters denote like parts throughout the various views.

DETAILED DESCRIPTION OF A PREFERRED EMBODIMENT

Figure 1:
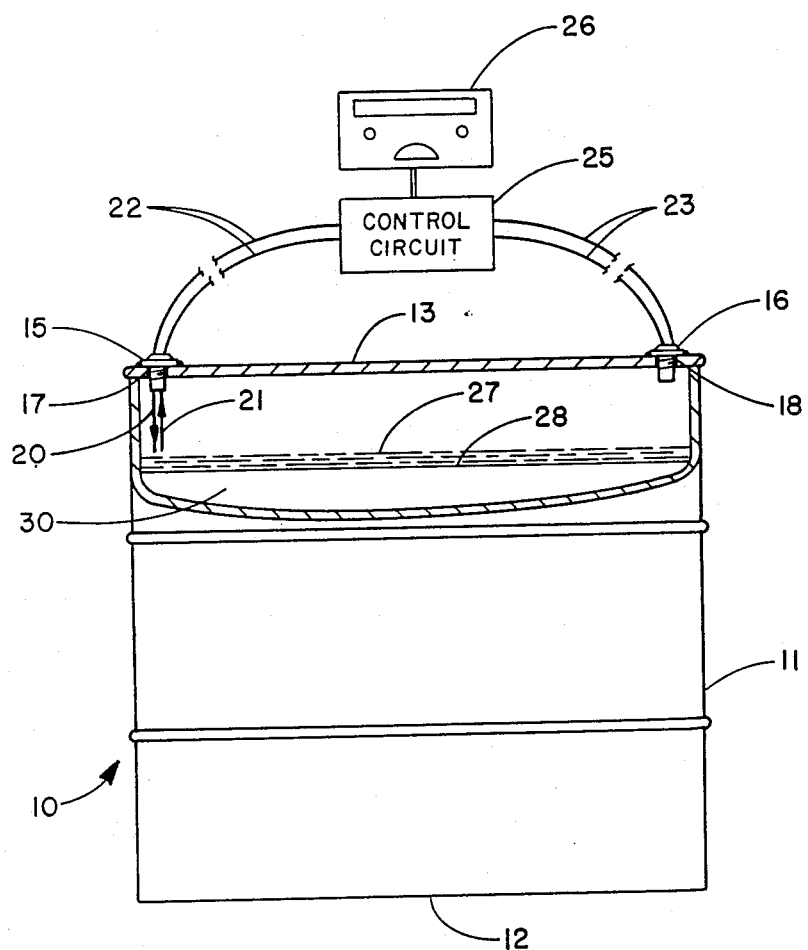
FIG. 1 is a front elevational view, partly in section, of a sealed container provided with devices for measuring the level of the container contents at two diametrically opposite locations.

Referring now in detail to the illustrative embodiment depicting in the accompanying drawings, there is diagrammatically shown in FIG. 1 a large sealed enclosure in the form of a cylindrical container or drum 10, such as the type of sealed drum utilized in the disposal of nuclear waste materials. While the present invention is especially suited for nondestructively detecting the absence or presence of free liquids in sealed drums containing solidified radioactive waste or radwaste, it should be understood that the present invention is not restricted thereto, but has utility in any application where it is desired to nondestructively determine the presence or volume of liquid in a sealed container.

The drum 10 comprises a generally cylindrical side wall 11, a bottom wall 12 and a top wall 13 formed to provide an airtight container. The drum 10 preferably is formed of steel and can be of a relatively large size having a capacity ranging from 50 cubic feet (374 gallons) to 170 cubic feet (1269 gallons) for example. However, the invention is applicable to containers of smaller sizes including the conventional 55 gallon drums and is limited only by the sensitivity of the liquid level detectors.

In accordance with this invention, the drum 10 is provided with liquid level detecting means, such means comprising a pair of diametrically opposed wave energy probe devices, such as for example in the form of ultrasonic transducer heads 15 and 16 threaded into suitable tapped openings 17 and 18 formed in the top wall 13. These transducer heads 15 and 16 are located opposite each other at a 180° angle, with the heads 15 and 16 disposed in as close a proximity to the peripheral edge of top wall 13 as possible.

The transducer heads 15 and 16 are adapted to transmit and direct sound waves 20 toward the surface of the waste material, whether liquid or solid, and the reflected echo 21 therefrom is returned and sensed by the heads 15 and 16. The transit time of ultrasonic transmission and echo return is indicative of the waste surface level. The heads 15 and 16 are provided with suitable conducter leads 22 and 23, respectively, connected to a suitable control circuit 25 which also serves to measure the elapsed time between the transmitted and reflected signals to produce an output signal, which can be applied to a visual display indicator 26 calibrated in terms of waste level. The control circuitry 25 and indicator 26 forming a part of the monitoring equipment can be remotely located, as desired. Since the ultrasonic transducer heads 15, 16 and monitoring equipment therefor can be conventional, no further amplification or description thereof is believed necessary. A commercially available ultrasonic transducer head that can be employed in the present invention is marketed by NP Industries, Inc., of Tonawanda, N.Y. under the trade mark "SODARLEVEL".

The transducer heads 15 and 16, which are relatively inexpensive compared to the cost of the large waste containers of 50 cubic feet and larger capacities can be a permanent part of the containers 10 for disposal therewith and made adaptable for connection to the control circuitry and monitoring equipment located at either a loading or disposal site.

The radwaste contents of the drum 10 is typically introduced in liquid form. A solidifying agent is then applied for solidifying the waste material so that, after sealing, any deterioration, damage or perforation occurring to the drum will not cause liquid to seep out into the adjacent environment. The three common agents utilized to solidify liquid waste are cement, urea formaldehyde (UF) and bitumen.

During cement solidification of liquid waste, enough water is added to a mixture of the waste and cement to physically mix the components into a smooth paste or slurry. Excessive water content in the mixture can result in free liquid forming out of the mixture upon solidification after the drum is sealed. The denser cement will settle to the bottom of the container, forcing any appreciable amount of free liquid to the top surface of the cement.

Urea formaldehyde (UF) is generally combined with liquid waste in the volume ratio of one part UF resin to two parts liquid waste, plus two volume percent of catalyst. However, compositions up to approximately 3.5 volumes of waste per volume of UF resin have been used. The urea formaldehyde, upon setting, generally produces some free liquid on the order of from 0.50 to 1.50 volume percent.

The bitumen solidification process employs relatively high temperatures and usually causes the liquids to evaporate prior to solidification. However, sometimes free liquid formation will occur if organic liquids or oils are present in the liquid waste or the evaporation step fails to remove all of the water. Thus, there exists the possibility of the formation of free liquids in sealed containers of solidified liquid radwaste employing any of the three solidifying methods mentioned above.

Figure 2:
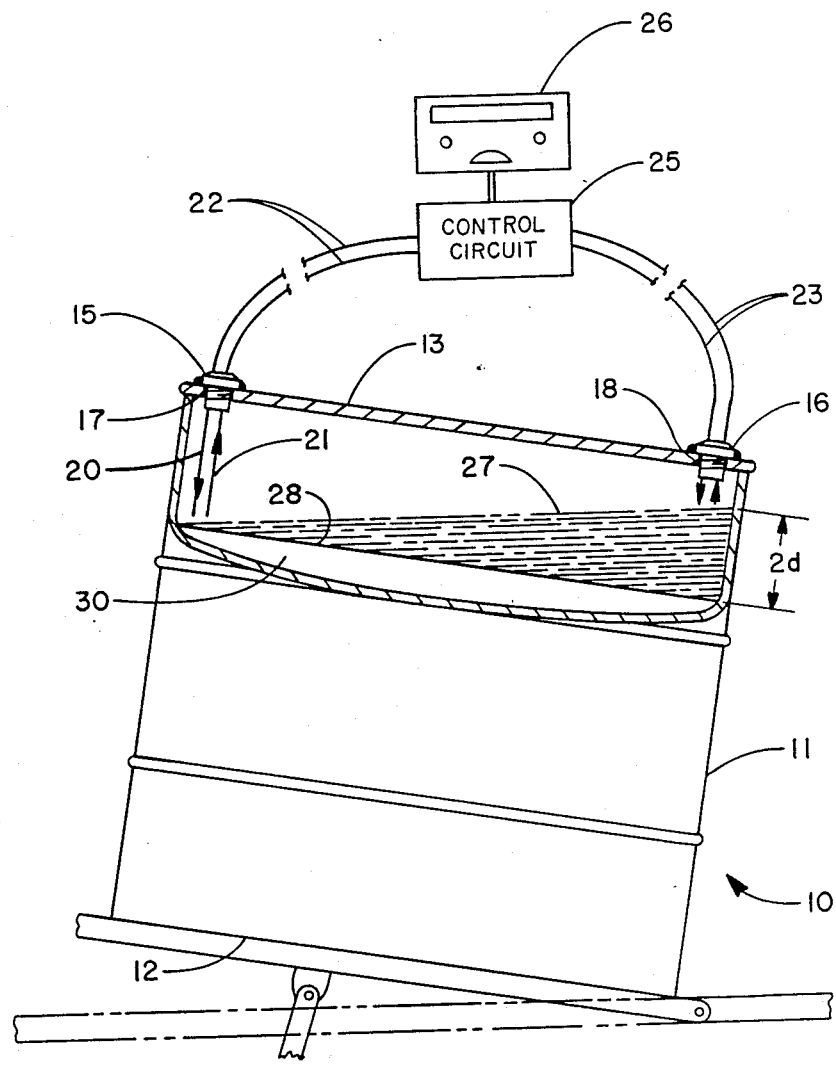
FIG. 2 is a view similar to FIG. 1, showing the container in a tilted position.

The sealed drum 10 diagrammatically shown in FIG. 1 depicts such a formation of free liquid 27 on the top surface 28 of a body of solidified waste 30. In accordance with the present invention, the method for nondestructively detecting the presence and extent of such liquid includes slowly titling the drum 10 in a direction toward one of the ultrasonic transducer heads, such as towards head 16 as shown in FIG. 2, causing the top surface 28 of the solid to tip along therewith. While the top surface of the liquid 27 remains level, the level sensed by ultrasonic transducer head 15 will progressively decrease during such titling movement until the sound signals transmitted thereform strike the solid waste surface 28. When the waste level sensed by head 15 remains constant, as occasioned by the sound waves being reflected off solid waste surface 28, the liquid level sensed by head 16 is noted. Any measurable difference between the levels detected by transducer heads 15 and 16 confirms the presence of liquids in the drum. Also, this measured difference, identified as 2$d$ in FIG. 2, constitutes twice the depth of the free liquid in drum 10 when otherwise disposed in its normal upright position. Knowing the depth of free liquid, as well as the diameter of drum 10, the estimated volume of free liquid present in drum 10 can be readily derived or calculated by the formula $\Pi r^2 d$ where "r" is the radius of drum 10 and "d" is the depth of the free liquid present. While the surface 28 of the solid waste 30 may be somewhat irregular, the resultant error will be minimal and would not affect a determination of the "legal status" of the waste container.

In the absence of free liquid above the solidified waste surface 28, tilting of the drum 10 would yield the same measured level of waste at both diametrically opposite sensing locations, thus confirming the absence of free liquids in drum 10.

The foregoing free liquid determination test can be practiced by placing and securing the drum 10 on a power actuated, pivotal platform adapted to be swung in a vertical arcuate path about a horizontal pivot axis. If desired, the pivotal platform can form a part of the flat bed utilized in transporting the radwaste containers. The above described testing procedure can be practiced either at the loading site or, if insisted by the receiving state, at the permanent disposal site.

From the foregoing, is apparent that the objects of the present invention have been fully accomplished. As a result of the present invention, a new and useful method is provided for ascertaining the presence and amount of free liquid formed in a sealed drum containing solidified waste. This is especially significant in satisfying regulatory requirements precluding the burial or final disposal of sealed drums containing solidified radwaste having free liquid formations therein. The procedure of this invention not only is effective in nondestructively determining the presence of free liquids in sealed containers, but also in estimating the extent or volume of such liquid therein.

It is to be understood that the form of the invention herewith shown and described is to be taken as an illustrative embodiment only of the same, and that various procedural changes may be resorted to without departing from the spirit of the invention.

I claim:

1. A method for nondestructively detecting liquids on the top surface of solidified material contained in a sealed enclosure comprising: providing a pair of devices utilizing wave energy for measuring the level of contents contained in the enclosure, mounting said devices in the top wall of the sealed enclosure at diametrically opposed locations, respectively, adjacent the periphery of said top wall, tilting said enclosure toward one of said measuring devices while simultaneously measuring by said device the level of said contents at the two diametrically spaced locations, noting and determining the level value of said contents measured by one of said one devices when the level value measured by the other of said devices remains constant, whereby any measured difference of level values of the contents between the two spaced locations indicates the presence of liquid within the sealed enclosure.

2. A method according to claim 1, including deriving a normal depth of any liquid present in said enclosure when disposed in a normal upright position from said measured difference of level values.

3. A method according to claim 2, including calculating the volume of said liquid in said enclosure after determining the depth of said liquid therein.

4. A method according to claim 1, wherein said measuring devices comprise said ultrasonic transducers transmitting ultrasonic signals to the top surface of said contents and receiving reflected ultrasonic signals therefrom.

* * * * *